(12) United States Patent
Nishino et al.

(10) Patent No.: US 6,409,603 B1
(45) Date of Patent: Jun. 25, 2002

(54) GAME DEVICE, GAME PROCESSING METHOD, AND RECORDING MEDIUM

(75) Inventors: Akira Nishino; Toru Ohara; Shuntaro Tanaka; Yuichi Matsuoka, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/202,788

(22) PCT Filed: Apr. 24, 1998

(86) PCT No.: PCT/JP98/01912

§ 371 (c)(1),
(2), (4) Date: Dec. 22, 1998

(87) PCT Pub. No.: WO98/47588

PCT Pub. Date: Oct. 29, 1998

(30) Foreign Application Priority Data

Apr. 24, 1997 (JP) ............................................. 9/107704

(51) Int. Cl.[7] .................................................. A63F 9/24
(52) U.S. Cl. .............................. 463/43; 463/30; 463/31; 273/430; 273/432
(58) Field of Search ......................... 463/43, 44, 30–33, 463/34–37; 273/148 B, 432, 430, 431; 434/322

(56) References Cited

U.S. PATENT DOCUMENTS

| 5,941,774 | A | * | 8/1999 | Takemoto et al. ............ 463/31 |
| 6,017,272 | A | * | 1/2000 | Rieder ......................... 463/31 |
| 6,045,447 | A | * | 4/2000 | Yoshizawa et al. ........... 463/31 |

FOREIGN PATENT DOCUMENTS

| JP | 7-163754 | 6/1995 |
| JP | 7-244567 | 9/1995 |
| JP | 8-289974 | 11/1996 |
| JP | 9-75551 | 3/1997 |
| JP | WO98/47588 | 10/1998 |
| TW | 82107869 | 9/1993 |

* cited by examiner

*Primary Examiner*—Jessica J. Harrison
*Assistant Examiner*—Sheila Clayton
(74) *Attorney, Agent, or Firm*—Finnegan, Henderson, Farabow, Garrett & Dunner, L.L.P.

(57) ABSTRACT

A game apparatus requiring certain operations of a player within a time limit which displays a first window (W1) for a period of time within a first time limit (TM1), displays a second window (W2) for a period of time within a second time limit (TM2) separate from the first time limit (TM1), and displays at least once the aforementioned first window (W1) during the second time limit (TM2).

17 Claims, 10 Drawing Sheets

GAME DEVICE, GAME PROCESSING METHOD, AND RECORDING MEDIUM

TECHNICAL FIELD

The present invention relates to a video game apparatus, and more particularly to an improvement to adventure games, wherein the game scenario (corresponding to a movie script, with scene development and lines for each scene of the game) changes according to a player's actions.

BACKGROUND ART

With a game apparatus for adventure games, the game scenario changes according to a player's actions. These game apparatuses display a frame (window) listing a plurality of choices, whereby the player's intent is transmitted to the game apparatus during the game. The player selects the desired choice from among the choices listed in this choice window using an input apparatus such as a mouse or game pad. The game apparatus reflects this choice in game points and changes the scenario according to the choice. However, as players grow accustomed to such games, they lose interest even in new games. For this reason, the game industry must add new interest to these adventure games. It becomes difficult to give the player a sense of speed and suspense, especially when keeping the simple format of displaying the choice window for the player to select a choice. This becomes a factor in games quickly losing popularity.

DISCLOSURE OF THE INVENTION

It is an object of the present invention to provide a game with new interest added to an adventure game. In other words, it is an object of the present invention to provide a game which can transmit a greater sense of tension to a player, than was possible before, by setting up double time limits.

It is another object of the present invention to provide a game which can transmit a greater sense of tension to a player, than was possible before, by setting up time limits for player operations, and also by changing at successive intervals the possible actions of the player as time passes.

It is another object of the present invention to provide a game which can transmit a greater sense of tension to a player, than was possible before, by setting up time limits for player operations and making the player search for something during the time limit.

In order to achieve the objects discussed above, the present invention is a game apparatus requiring certain operations of a player within a time limit, wherein a first window is displayed within a first time limit, a second window is displayed separately from the aforementioned first window within a second time limit, and the aforementioned first window is displayed at least once during the display of the aforementioned second window.

In another embodiment of the present invention, the following apply to each of the aforementioned first windows which is displayed at least once. The display and the aforementioned first time limit, according to the display, are established in advance. When a player makes a certain choice within the first time limit set by the first window or the pertinent time limit passes for the first window for one set of display contents, that display is ended. Also, if the aforementioned second time limit is not over when the display of the pertinent first window ceases, another first window is displayed once more. In another embodiment of the present invention, subsequent game scenarios are varied according to the actions of the player for the aforementioned first window, or whether those actions were not taken within the aforementioned first time limit.

In another embodiment of the present invention, the following apply to the aforementioned second window. A plurality of displays and the aforementioned second time limit, according to the displays, are established in advance. Another second window, to be displayed next, is selected according to the actions of the player for the aforementioned first window and the number of first window actions taken within the second time limit.

In another embodiment of the present invention, the first time limit of the aforementioned first window and the second time limit of the aforementioned second window are displayed with an image to show the passage of time, the length of which changes as time passes.

Another embodiment of the present invention is a game apparatus requiring a player to take certain actions within a time limit, wherein windows actionable by a player are displayed and the display mode of the windows changes gradually as time passes.

In another embodiment of the present invention, the aforementioned window displays a plurality of choices which a player can select and gradually changes the choices displayed in the window as time passes.

Another embodiment of the present invention is a game apparatus requiring a player to take certain actions within a time limit, wherein a plurality of images are displayed within a window and the game scenario is changed according to which image is selected by the player from among the plurality of images during the aforementioned time limit.

In another embodiment of the present invention, the display mode of the aforementioned window is changed as time passes. In another embodiment, the images displayed in the aforementioned window are successively changed as time passes. In another embodiment, the time limit for the aforementioned window is shown with an image to show the passage of time, the length of which changes as time passes and which is located along the edge of the window.

The present invention is also a game processing method which comprising the embodiments and constitution discussed above. Also, the present invention is a recording medium comprising the embodiments and constitution discussed above.

BEST MODE FOR CARRYING OUT THE INVENTION

Next, the best modes for carrying out the invention are explained with reference to the figures.

First Embodiment

The first embodiment of the present invention relates to an adventure game with double time limits.

Constitution

Figure 1:
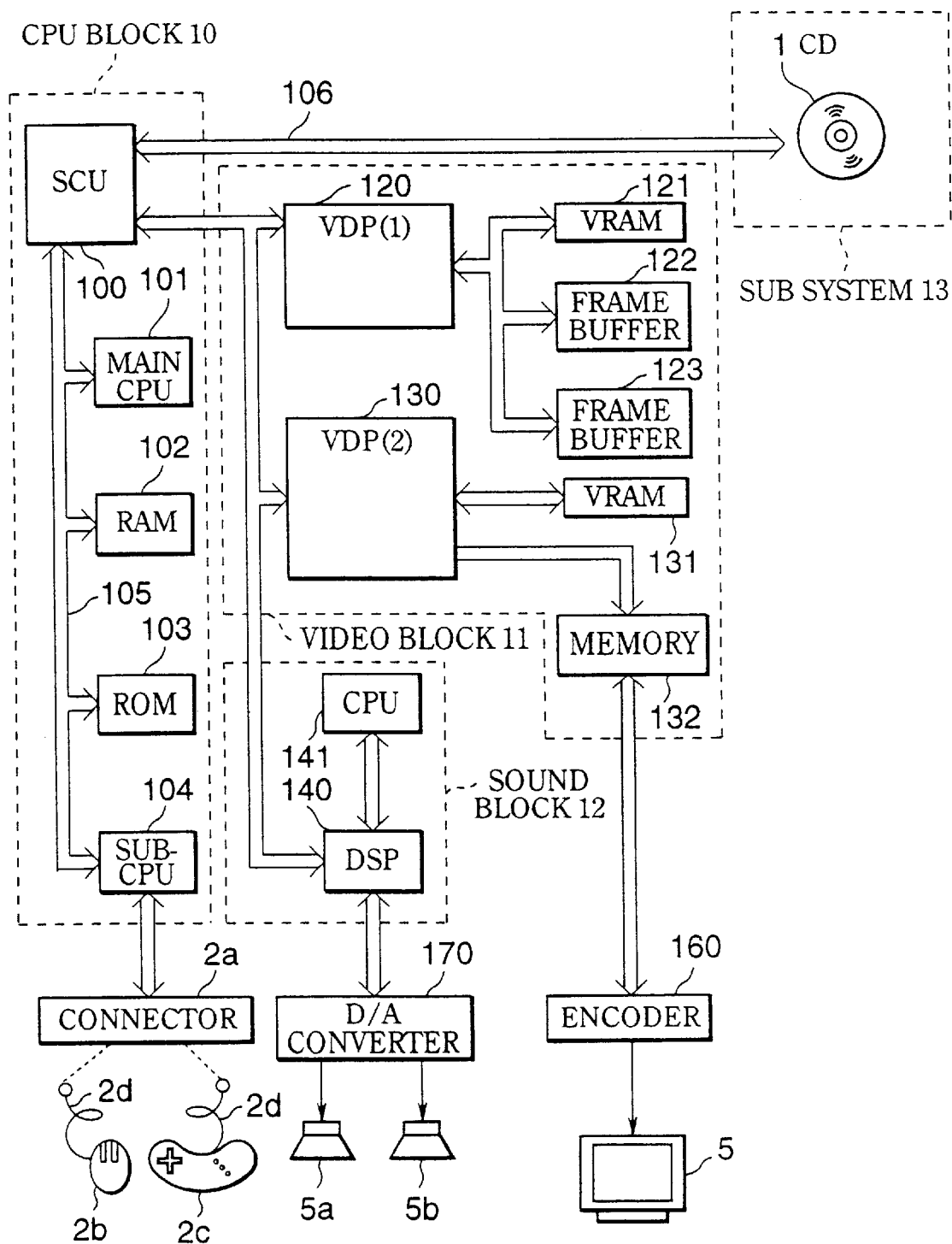
FIG. 1 is a block diagram of the game apparatus relating to the present invention.
Figure 2:
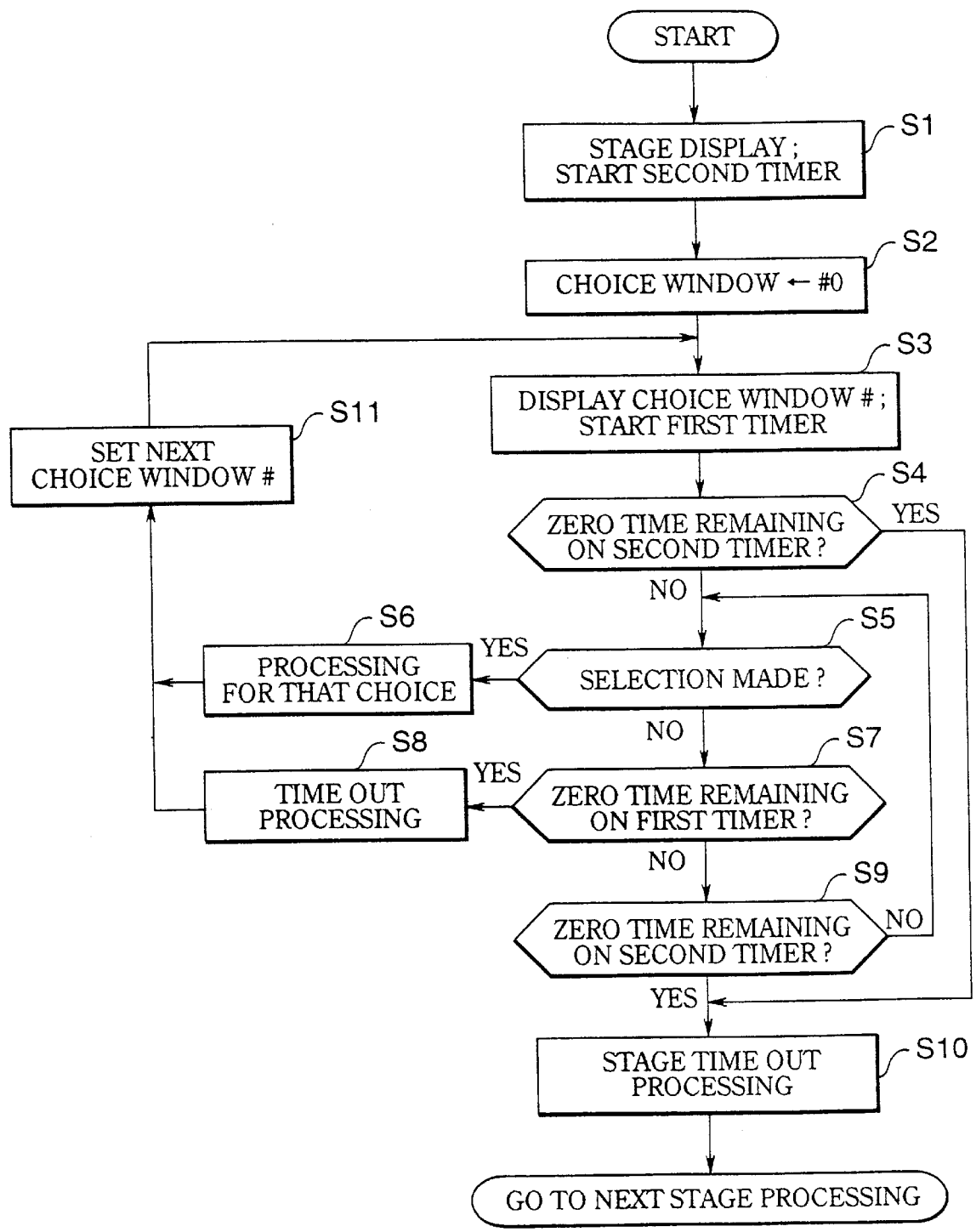
FIG. 2 is a flow chart for explaining the processing of a first embodiment of the present invention.

As shown in FIG. 1, the game apparatus relating to the first embodiment comprises the following: CPU block 10 for controlling the entire apparatus, video block 11 for controlling the display on the game screen, sound block 12 for generating sound effects or the like, and subsystem 13 for reading a CD-ROM 1. This game apparatus operates according to the flow chart in FIG. 2 as the CPU block 10 executes a program read from the CD-ROM 1.

Constitution of CPU Block

The CPU block comprises an SCU (system control unit) 100, main CPU 101, RAM 102, ROM 103, sub-CPU 104, CPU bus 105, and the like.

The main CPU 101 is provided a DSP (digital signal processor) therein and is constituted to be able to execute high speed processing based on program data transferred from the CD-ROM 1. The RAM 102 is constituted to be able to be used as a work area for MPEG images and program data of the application software read from the CD-ROM 1 and as an error correction data cache during CD-ROM decoding. The ROM 103 is constituted to be able to store initial program data for initialization processing of the apparatus. The SCU 100 is constituted to be able to control the transfer of data by means of the buses 105, 106. Also, the SCU 100 is provided a DMA controller therein and is constituted to be able to transport image data, necessary for game execution, to the VRAM within the video block 11.

The mouse 2b and pad 2c are constituted to be able to generate operation signals on the basis of player operations. The sub-CPU 104 is called an SMPC (System Manager & Peripheral Control) and is constituted to be able to acquire operation signals by means of the connector 2a and cord 2d from the mouse 2b upon request from the main CPU 101. Moreover, the operation signals may be transported to the sub-CPU 104 by wireless communication, such as a remote control, instead of the cord 2d.

Constitution of Video Block

The video block 11 comprises a VDP (video display processor) 120, VRAM 121, and frame buffers 122, 123.

The VDP 120 is constituted to be able to alter images based on texture data on the basis of draw commands stored in VRAM 121, generate image data based on non-texture data such as polygons, perform color calculations of shadows, shading and the like, and write the image data generated to the frame buffers 122, 123.

The VDP 130 is constituted to be able to carry out image processing such as the following and to store display image data in memory 132: backside processing such as clipping and display priority processes, motion processing, enlarge-shrink, rotation, and mosaic processing, processing to create shadows, and window processing to establish choice windows, on the basis of image data stored in the frame buffers 122, 123. VRAM 121 is constituted to be able to store draw commands transmitted from the main CPU 101 by means of SCU 100.

The frame buffers 122, 123 are constituted to be able to store image data generated by VDP 120.

The memory 132 is constituted to be able to store image data for drawing from the VDP 130 and output the image data to the encoder 160.

The encoder 160 is constituted to be able to convert image data for drawing stored in memory 132 to a video signal format, perform D/A conversion of the image data, and supply the converted image data to the monitor apparatus 5.

The monitor apparatus 5 is constituted to be able to display images based on the video signal supplied.

Constitution of Other Blocks

The sound block 12 comprises a DSP 140 and CPU 141.

The DSP 140 is constituted to be able to synthesize voices according to a PCM system or FM system and output the voice data generated to a D/A converter 170. The CPU 141 is constituted to be able to control the DSP 140 on the basis of commands supplied from the CPU block 10. The D/A converter 170 is constituted to be able to convert the voice data generated by the DSP 140 to a two-channel signal and supply this signal to speakers 5a and 5b.

The subsystem 13 comprises a CD-ROM drive and is constituted to be able to read the image data and program data of the application software from the CD-ROM 1 and supply this data to the CPU block 10.

Operation

Figure 3:
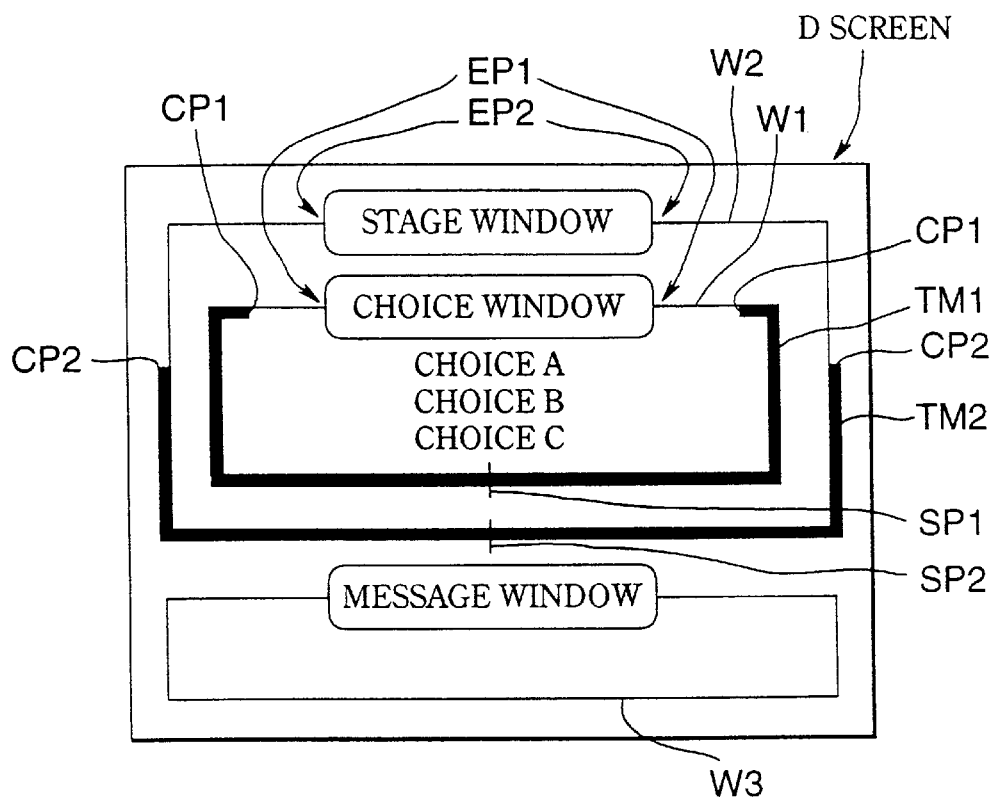
FIG. 3 is an example of the screen layout of an embodiment of the present invention.

Images displayed with the present invention are defined as follows. As shown in FIG. 3, a screen D displayed on the CRT cathode ray tube of the monitor apparatus 5 comprises three windows W1, W2, and W3 and a background region exclusive therefrom.

One or more choices (Choices A, B, and C in this figure) are listed and displayed in the choice window W1. The image of the game stage is displayed in the stage window W2. Messages corresponding to the scenario of the game displayed in the stage window are displayed in the message window W3.

The stage window W2 displays images set up for the current game stage. Here, "game stage" means a unit in the game wherein an entire scene is developed within the scenario of the game. The entire game is made up of one or more game stages. The scenario is constructed so that one game stage is connected to the next game stage. Depending on the scenario, the choice window W1 is displayed one or more times in one game stage.

The player participates in the game as a protagonist in the scenario. Acting on behalf of the protagonist, the player enters the world of the game and quests for the conclusion of the game, while building relationships with the actors in the game (characters). This mutual understanding is formed by displaying questions from the characters as script lines in the message window W3, while the player indicates his/her intent by selecting choices displayed in the choice window W1 using the mouse or pad. When the player operates the pad or the like and selects any of the choices, the game stage advances to the next scenario corresponding to that choice. As the scenario progresses, other questions are provided to the message window W3 once more and the corresponding choice window W1 is displayed. The game advances through the repetition of these steps.

Moreover, the display of a timer, for limiting the amount of time to make a choice, is located on the edges of the choice window W1 and stage window W2. Whenever the choice window W1 is displayed, the display bar of the first timer TM1 advances from the starting point SP1 toward the ending point EP1. In this figure, the display bar of the first timer TM1 is moving through the current point CP1. Also, at the same time that a new game stage is displayed in the stage window W2, the display bar of the second timer TM2 advances from the starting point SP2 toward the ending point EP2. In this figure, the display bar of the first timer TM2 is moving through the current point CP2.

The image data for the choice window W1, stage window W2, and message window W3 are supplied once from the CD-ROM 1 to the RAM 102 by the CPU 101 and are then supplied to the video block 11. Also, image data for backside images are supplied to the video block 11 via the same path. The priority data for backside images are set lower than the priority data for the choice window, and the like. The CPU 101 also supplies draw commands for displaying the stage window W2, choice window W1, and message window W3 to the video block 11. Also, priority data higher than the priority data for the message window W3 are established for the choice window W1 and are supplied to the video block 11.

The VDP 120 of the video block 11 displays the stage window W2, choice window W1, and message window W3 on the basis of the draw command. After drawing the backside image in memory 132, the VDP 130 supplies image data to display the choice window W1 with higher priority data than that of the stage window W2 to the memory 132 on the basis of priority data. As a result, when the choice window is displayed, the choice window W1 is displayed in front and is not hidden by the stage window W2. Also, the CPU 101 monitors the time from the start of the game stage on the basis of the timer function of the SCU 100. The CPU 101 supplies the draw command, for displaying the display bar of the second timer TM2 corresponding to the passage of time from the start, to the video block 11. The display bar of the second timer TM2, which changes over time from the stage beginning, is thereby displayed along the edge of the stage window. Meanwhile, for the time over which the choice window is displayed, the CPU 101 monitors the time from the start of choice window display on the basis of the timer function of the SCU 100. The CPU 101 supplies the draw command, for displaying the display bar of the first timer TM1 corresponding to the passage of time from the start, to the video block 11. The display bar of the first timer TM1, which changes over time from the start of choice window W1 display, is thereby displayed along the edge of the stage window W2.

Explanation of Operation

Next, the operation of the first embodiment is explained. The game of the embodiment comprises a plurality of game stages. The following explanation covers one game stage, from start to finish, with reference to FIG. 2.

Step S1: The stage image is displayed in the stage window W2. At the same time, the second timer TM2 is started. At the same time that the second timer TM2 is started, the second timer display bar grows from the starting point SP2 on the outer edge of the stage window W2 as time passes. The speed of the second timer TM2 is set so that the display bar extends from the starting point SP2 to the ending point EP2 over the course of five minutes, for example.

Step S2: As the scenario progresses, character messages are displayed in order in the message window W3. Until the initial choice window W1 is displayed, the number # of the choice window W1 to be displayed is zero.

Step S3: The number # (initially zero) of the choice window W1 is displayed. In other words, in the scene where the scenario progresses, another character asks a question and the player as the protagonist answers, the character's question is displayed in the message window W3 and the choice window W1, listing the responses thereto, is displayed. At the same time that the choice window W1 is displayed, the first timer TM1 is started, as shown in FIG. 3. When the first timer TM1 is started, the display bar of the first timer extends from the starting point SP1 as time passes. The speed of the first timer TM1 is set so that the display bar extends from the starting point SP1 to the ending point EP1 over the course of ten seconds, for example. This speed setting is preferably different for each choice window W1 (in effect for each number #). For example, the speed is higher for a scenario wherein a player has to make a quick decision and oppositely, the speed is lower when the player has to make a certain choice.

Step S4: It is determined whether the second timer TM2 has zero time remaining, in other words, if the end of the display bar has reached the ending point EP2. If it has reached the ending point EP2 (S4. YES), the process advances to time out processing (S11) for the stage. So long as it has not reached the ending point EP2 (S4. NO), the process advances to Step S5.

Step S5: It is determined whether a choice in the choice window W1 has been selected. The player selects a choice using the mouse or pad by moving the cursor (arrow or the like) to the desired choice and clicking the mouse or pressing the specified button on the pad.

Step S6: If a choice has been selected (S5. YES), the game scenario is altered according to that choice. For example, this changes the feeling of goodwill of another character for the protagonist, or changes the number of game points (score or the like). Once the processing corresponding to the choice is complete, this choice window W1 is closed.

Step S7: If a choice was not made (S5. NO), it is determined whether the first timer TM1 has zero time remaining, specifically, whether the display bar has reached the ending point EP1.

Figure 4:
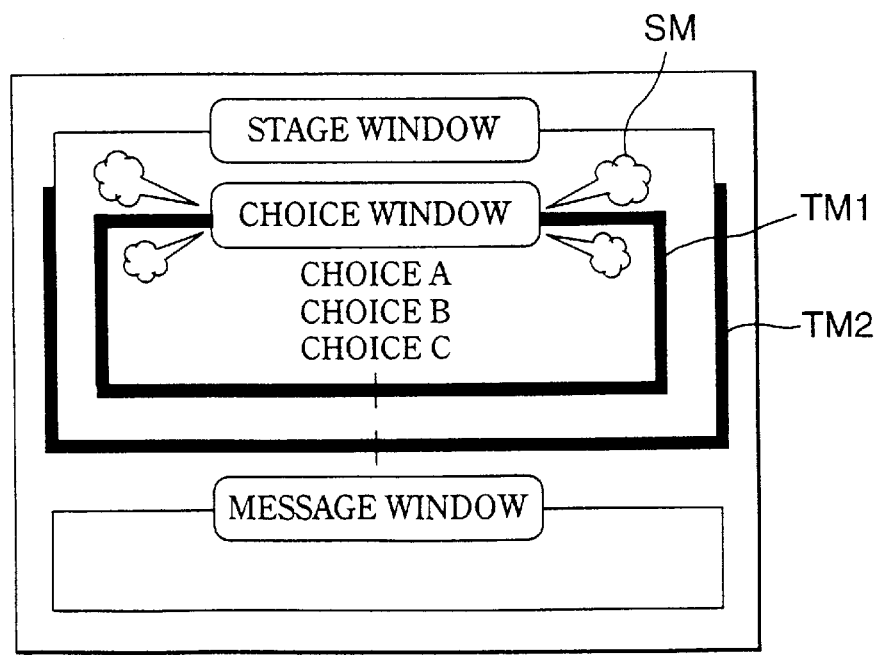
FIG. 4 is an example of the screen when a first timer TM1 has timed out.

Step S8: If the display bar of the first timer TM1 has reached the ending point EP1 (S7. YES), time out processing is carried out. As shown in FIG. 4, for example, an image, such as smoke SM blowing out from the ending point EP1 of the first timer TM1, is displayed to show that the process has timed out. Afterwards, the choice window W1 is closed.

In the present invention, timing out is treated in the same way as the selection of a choice. In effect, this is choosing "to choose none of the available choices." This selection is a passive choice and may result in other characters having less goodwill for the protagonist or a loss of game points.

Step S9: If the display bar of the first timer TM1 has not reached the ending point EP1 (S7. NO), it is again determined whether the second timer TM2 has reached the ending point EP2. If the display bar of the second timer TM2 has not reached the ending point EP2, steps S5–S9 are repeated. In effect, these processes are repeated until a choice is made (S5. YES), or until the first timer TM1 times out (S7. YES).

Figure 5:
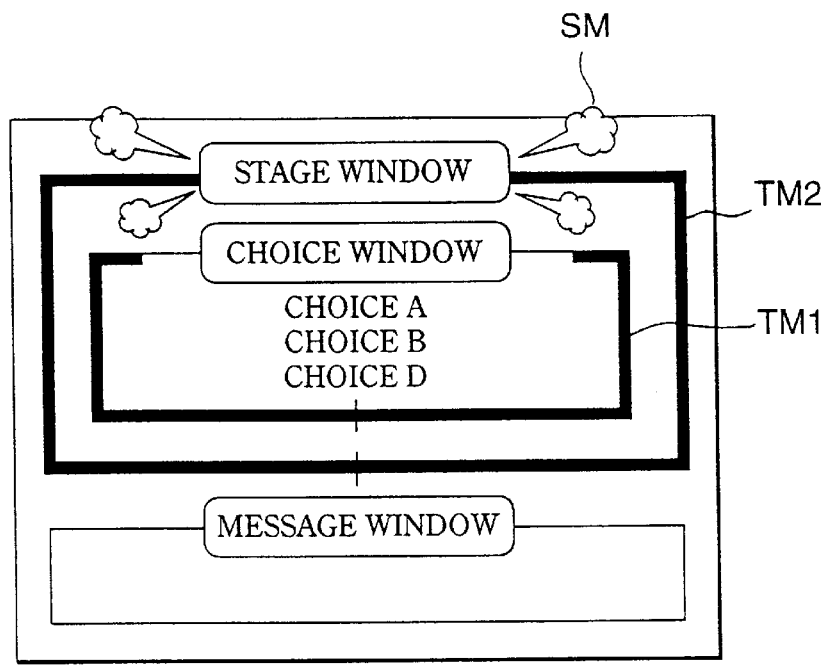
FIG. 5 is an example of the screen when a second timer TM2 has timed out.

Step S10: Stage time out processing is carried out if the display bar of the second timer TM2 has reached the ending point EP2, or in effect, if it has timed out (S9. YES). The player is informed of the timing out as shown in FIG. 5, for example, where an image, such as smoke SM emitting from near the ending point EP2 of the second timer TM2, is displayed to represent timing out. Next, game points or goodwill from other characters are established according to the choice windows displayed in this stage or what choices were made in the choice windows and the scenario of the next game stage is varied accordingly. In addition to scenario changes, the next game stage displayed may also be changed depending on the game points or goodwill.

Step S11: As a result of the choice processing (S6), the number # of the next choice window W1 is established when one choice window is closed or when the first timer TM1 times out (S8). When the number # is established, the next choice window W1 is displayed in Step S3. In effect, new choice windows W1 are selected and displayed in order (S3) so long as the second timer TM2 has not timed out.

Embodiment 1

An example is used for better understanding of the first embodiment.

The first example relates to a scenario wherein the player, as the protagonist, asks a girl, who is another character, out on a date.

Scenario of the game stage: The protagonist wants to ask a girl, who is another character, out on a date, so he has to win her over. However, he only has five minutes to talk to her because she has something to do. The protagonist has to get her attention somehow within five minutes and get her to agree to go out.

The game stage develops within this scenario. The time limit of the second timer is set for the five minutes that the protagonist can talk to the other character. Table 1 shows the other settings, such as the time limit of the first timer, the lines of the girl displayed in the message window, the choices (protagonist's lines) in the choice window which correspond thereto, the display time thereof, game points allotted to the choices, and response messages corresponding to the selection of the choices.

TABLE 1

| Choice window number | Lines in message window (girl) | Time limit for the first timer for the choice window | Choices (lines of protagonist) | Points for choices | Lines (girl's) in message window corresponding to the choices |
|---|---|---|---|---|---|
| Choice window 1 | Well, OK. But I've only got five minutes¼ | 10 sec. | You're looking great! | +2 | Oh, why thank you! |
| | | | What's with your hair? | −5 | You are so rude! |
| Choice window 2 | I was going to Asakusa to see a movie, interested? | 15 seconds | I like those samurai films. | −1 | Oh? I'll pass on that. |
| | | | I like those "chick films". | +3 | Really? Me too! |

Figure 6:
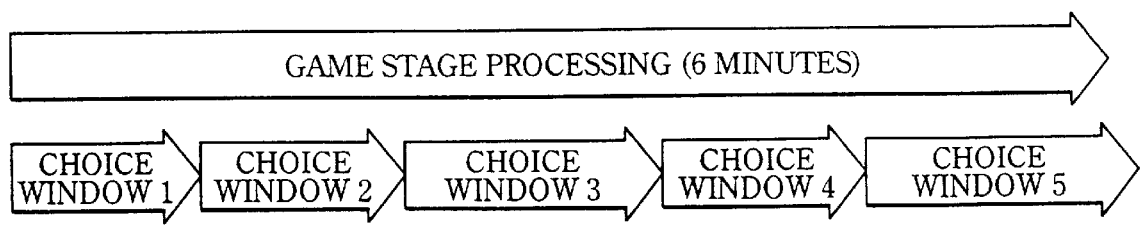
FIG. 6 is a diagram to explain the display of a window of choices for a game stage of a first example of the first embodiment.

In the first example, the time limit (second timer) for the game stage is set at five minutes as shown in FIG. 6. During that period, choice windows 1–5, having a plurality of different time limits (first timer), are displayed. The speed of the player's response determines how far he gets through the sequence of choice windows.

Table 1 illustrates the contents of choice windows 1 and 2. In this way, lines corresponding to the scenario are displayed in the message window and corresponding lines are displayed as choices in the choice windows. The player can play the game with a sense of tension because he has to make his choice within the aforementioned time limits. Also, the game may be constructed so that when the time limit is reached without the player making a choice, lines such as the girl saying "Well, I've got to go now. Bye!" are displayed in the message window and the player loses points.

Embodiment 2

In the second example of the first embodiment, the scenario is changed by the selection of a choice.

Figure 7:
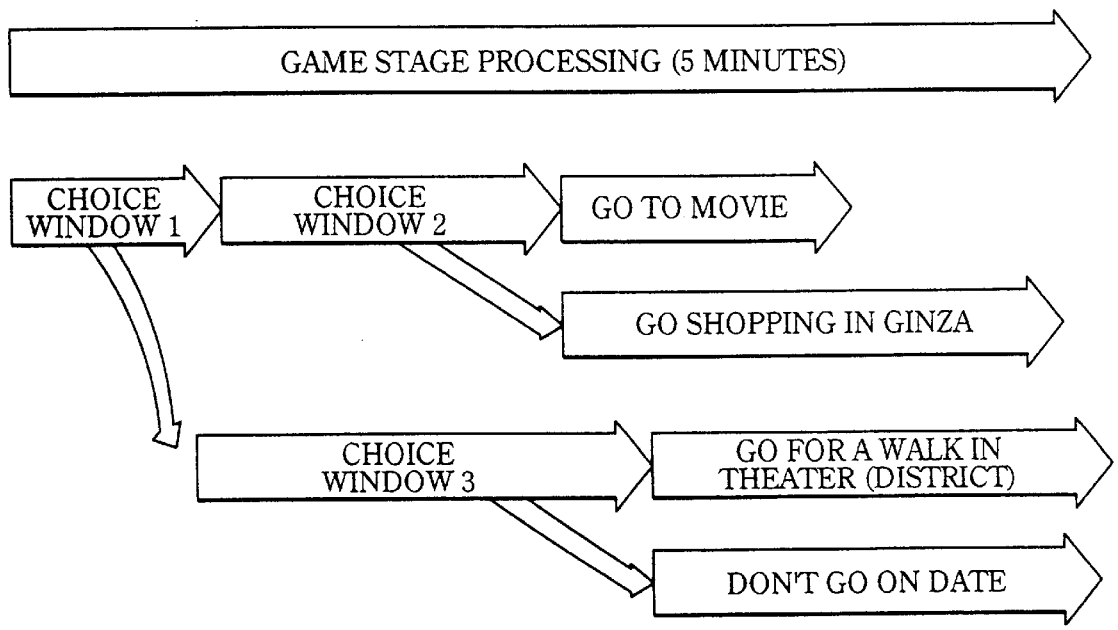
FIG. 7 is a diagram to explain the display of a window of choices for a game stage of a second example of the first embodiment.

In the scenario of asking a girl on a date as shown in FIG. 7, for example, the time limit of the game stage is set at five minutes, as above. Choice window 2 or choice window 3 is displayed next, depending on the player's choice in choice window 1. When the game advances to choice window 2, the choice made in choice window 2 results in either the scenario of going to see a movie with the girl develops or of going shopping in the Ginza District.

In the same way, when the game advances to choice window 3, the choice made in choice window 3 results in the scenario of going for a walk in the theater district together or of not going on a date.

Advantages

The first embodiment can provide a game which gives the player a greater sense of tension than before, because two time limits are established. In effect, choice windows with short time limits are successively displayed in a game stage with a relatively long time limit; the game therefore unfolds speedily, giving the player a greater sense of tension.

In particular, the game development can be changed by varying the time limits for the first timer according to the choice window.

The scenario is changed even when the player does not make a choice in the choice window; this can add interest to the game. Also, the first embodiment can provide a very interesting game wherein the scenario changes greatly depending on the player's responses, if the choice window displayed next changes according to the choice made in a choice window.

Second Embodiment

The second embodiment of the present invention relates to a game apparatus wherein the choices change as time passes.

Constitution

The game apparatus in the second embodiment uses the same type of game apparatus as the first embodiment. However, the CPU block 10 operates according to the flow chart in FIG. 8 by executing program data read from the CD-ROM 1. Also, the screen structure displayed in the present embodiment is the same as that in the first embodiment.

Operation

Figure 9:
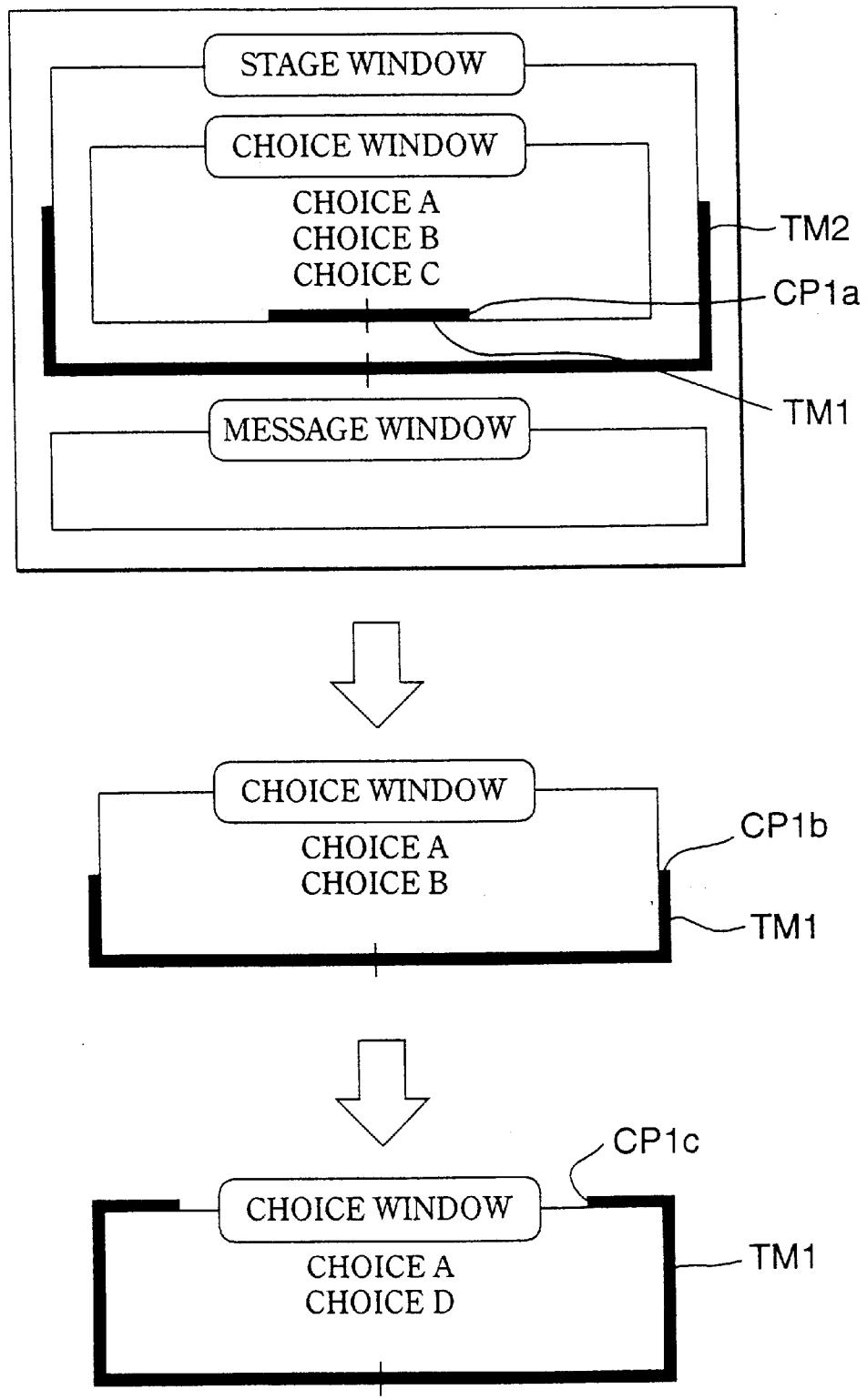
FIG. 9 is a diagram to explain the means of changing the choices for the second embodiment.

The operation of the second embodiment is explained next. In the present embodiment, the choices in the choice window W1 change depending on the location of the current point CP1 of the first timer TM1, as shown in FIG. 9. Table 2 shows the relationship between the choices and the current point in this figure.

TABLE 2

| Current point | Choices in choice window |
|---|---|
| CP1a | Choice A |
|  | Choice B |
|  | Choice C |
| CP1b | Choice A |
|  | Choice B |
| CP1c | Choice A |
|  | Choice D |

Figure 8:
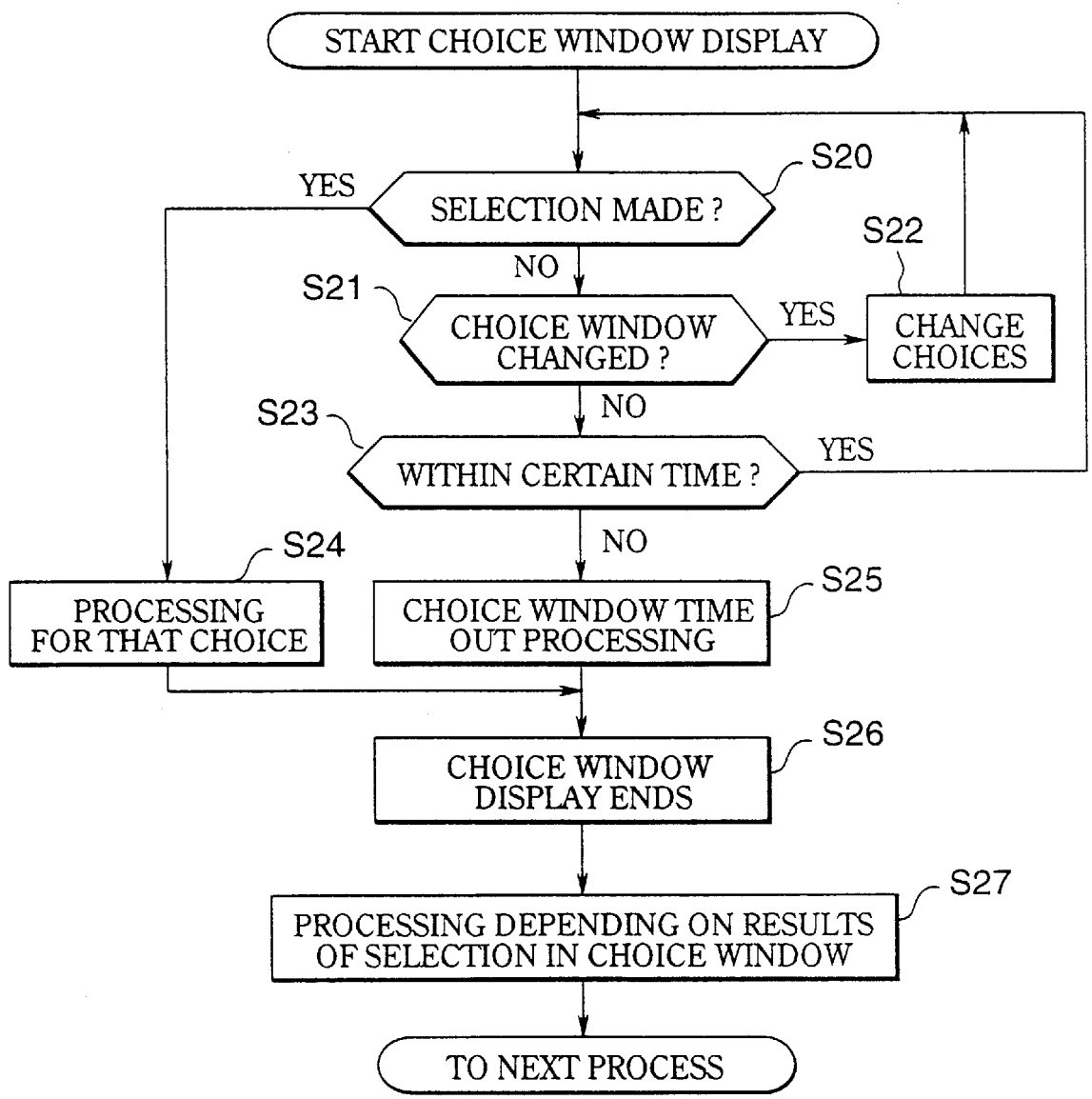
FIG. 8 is a flow chart to explain the processing in a second embodiment of the present invention.

The aforementioned process is explained in greater detail with reference to FIGS. 8 and 9. This flowchart corresponds to changes in processing, from when one choice window W1 is displayed until the time limit is reached, in the first embodiment.

Step S20: Initially, the choice window W1 is displayed. As shown in Table 2, choices A, B, and C are displayed. Once the first timer TM1 starts, the display bar of the first timer TM1 extends as time passes. It is then determined whether the player has selected one of the choices. If a choice has been made (S20. YES), the process advances to Step S24; if no choice has been made (S20. NO) the process advances to Step 21 sic.

Step S24: If a choice was made (S20. YES), processing is carried out for that choice. The choice window W1 is closed and the lines responding to that choice are displayed in the message window W3. For example, if the "speak out" choice was made, lines such as "What?" are displayed in the message window W3 as the response of the character to whom the player spoke. Afterwards, a scenario develops from the player, or rather the protagonist, having spoken to the other character.

Step S21: When the player has not made a choice (S20. NO), it is determined whether it is time to change the choices. At a time some seconds from the start of the display, the initial choices are changed and then changed again several seconds later. This timing is established in advance for each choice window W1 and stored as part of the program data. Consequently, the change timing varies depending on the location of the current point CP1. Whether it is time to change the choices is determined for each of a plurality of choices, because the determination of whether to delete, change, or not change is made for each choice individually.

Step S22: When it is time to change the choices (S21. YES), choices are deleted or added, or the choices are changed. If the choices are changed, the process returns to Step S20.

Step S23: When it is not time to change the choices (S21. NO), it is determined whether a certain period of time has passed. This period of time corresponds to the time limit of the first timer TM1.

When the certain time has not passed (S21. NO), it is determined once more whether a choice was made (S20).

Step S25: When a certain time has passed (S21. YES), specifically when the display bar of the first timer TM1 has reached the ending point EP1 and the time limit is up, time out processing is carried out for the choice window W1. The time out processing for the choice window W1 is the display of an image of smoke or the like emitting from the display bar (See FIG. 4) once the display bar of the first timer TM1 reaches the ending point EP1 sic.

Step S26: After the time out processing for the choice window W1, the choice window W1 is closed.

Step S27: Finally, the scenario of the next game stage is established according to whether some type of choice has been made in the choice window W1 and the player's score is calculated to show the positive feelings of the other characters for the protagonist.

EXAMPLE 1

An example of changing the choices in a scenario where the player, as the protagonist, calls out to a girl is explained as the first example of the second embodiment.

Figure 10:
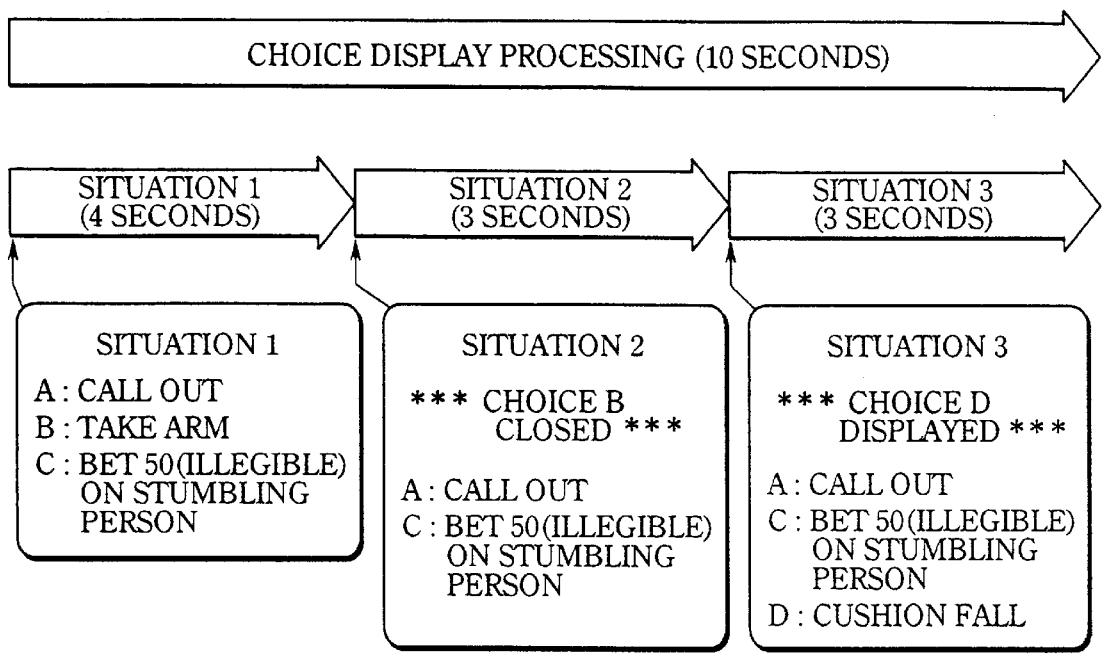
FIG. 10 is a diagram to explain the display of a window of choices for a game stage of a first example of the second embodiment.

As shown in FIG. 10, the choice window W1 is displayed for ten seconds and the choices are changed twice during that period. Choices for situation 1 in that figure are displayed at the same time the choice window W1 is displayed. When four seconds pass with no choice being made (S20 in FIG. 8. NO), the choice B is closed and situation 2 takes effect. When another three seconds pass with no choice, a new choice D is added for situation 3. When no choice is made in situation 3, the display of the choice window W1 is over (S23. NO).

This example is applied to a scenario where the girl is moving further away from the protagonist. Specifically, the girl, who is within arm's reach moves away, and the choice B is eliminated if the protagonist does not take her arm before she moves away. Then, the girl trips at the end of the situation 2 and as a result, the choice D, of acting as a "cushion" to break the girl's fall, is added in situation 3.

In the situation 1, choice B has a high number of game points. In effect, if the protagonist chooses "to take her arm", he'll get a large number of points. Likewise, in situation 3, a large number of game points may be set in the event of the player selecting choice D, to act as a "cushion" to protect the girl from harm by risking himself. The number of game points corresponds to the feelings of confidence and goodwill the girl has for the protagonist may contribute to the happy ending at the conclusion of the game.

The first example can provide diverse scenario developments which give the player a sense of tension, because the choices change to match the development of the scenario.

EXAMPLE 2

An example of changing the choices for a scenario in which the player, specifically the protagonist, is waiting for a pot to boil is explained as the second example of the second embodiment.

Figure 11:
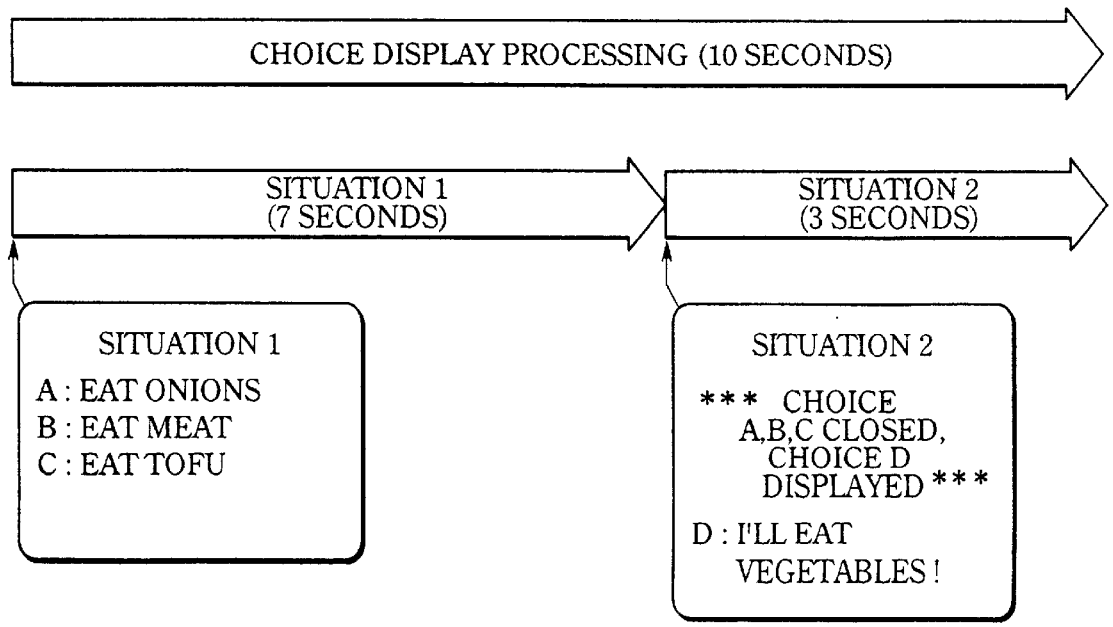
FIG. 11 is a diagram to explain the display of a window of choices for a game stage of a second example of the second embodiment.

As shown in FIG. 11, the choices change once in the second example. Situation 1 is a scenario before the pot boils, in which the protagonist chooses some parboiled ingredients to cook. Situation 2 is a scenario in which the ingredients have come to a boil. Whatever choice is made in situation 1, the choice to eat the parboiled ingredients reduces the number of game points; the choice to eat the boiled ingredients (vegetables) in situation 2 raises the number of game points. In situation 1, making no choice will result in a better score since the number of points drops regardless of the choice selected.

Because not making a choice is an active choice, the second example can provide more interest in play since the player has to make a variety of decisions.

EXAMPLE 3

An example of changing the choices in a scenario, wherein the player, specifically the protagonist, experiences an earthquake and helps panicking characters, is explained as the third example of the second embodiment.

Figure 12:
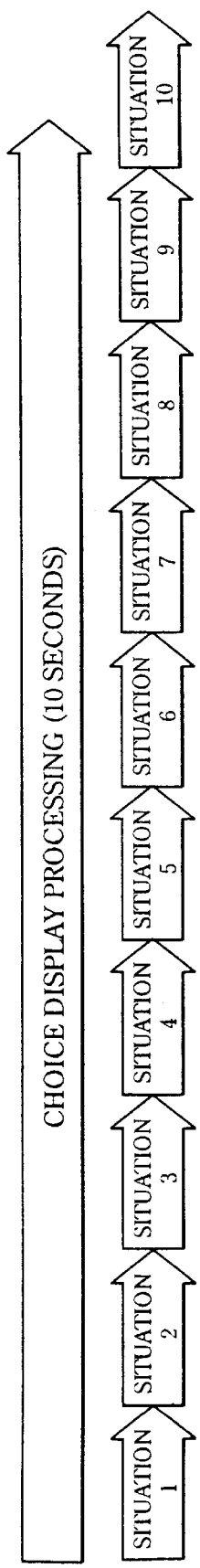
FIG. 12 is a diagram to explain the display of a window of choices for a game stage of a third example of the second embodiment.

In the third example, an earthquake occurs during a scenario of the game stage; images of characters experiencing an earthquake are displayed, along with an image such as the shaking of entire stage window W2. The choices displayed in a choice window W1 as shown in FIG. 12 undergo many changes. In effect, since the protagonist is in a situation of helping nearby people one after another during the earthquake, the names, or the like, of the characters which he/she can help at that time are displayed as choices for short periods of time from one to two seconds. The player quickly selects these choices and helps as many characters as possible within the time limit (10 seconds, for example).

Helping many characters raises the score and the later scenarios may be changed by the characters helped. For example, a character who was not helped, and was killed in the earthquake, will not appear in subsequent portions of the game. The third example can impart a great sense of tension and speed to the player by requiring the player to make instant decisions since the choices are changing so quickly.

EXAMPLE 4

The fourth example of the present embodiment creates the effects of the present embodiment by changing the display mode of the choices, as well as the contents of the choices as time passes.

For example, it is preferable that any of the choices be gradually enlarged or shrunk as time passes. In the case of selecting a choice with the mouse cursor pointer using a mouse or the like as in the present embodiment, the ease of selection is changed for each choice, when the size of the choice is changed. In effect, as a choice becomes larger, that choice becomes easier to select with the mouse. As a choice becomes smaller, that choice becomes harder to select with the mouse. For this reason, a choice which the player is encouraged to select can be enlarged; oppositely, a choice which the player is discouraged from selecting can be made smaller. Also, by enlarging or reducing all the choices, choices can be made "easy or difficult to select as time passes", even if the contents of the choices are not changed. The difficulty of the game can also be adjusted in this way. Moreover, the same effects can be attained by darkening the display of choices, to encourage selection, and lightening the display of choices, to discourage selection, instead of enlarging or reducing the choices.

Advantages

As explained above, the second embodiment is constituted to gradually change the contents of the choices available to the player as time passes. As a result, this can provide a game wherein a variety of scenarios can develop and wherein a greater sense of tension can be provided to the scenario player than before.

In particular, successively changing the choices in accordance with the scenario progress can provide diverse scenario development as well as a sense of tension to the player. Also, allowing "not choosing" to be an active choice diversifies the decisions required of the player and can add interest to the game.

Furthermore, changing the choices in a short period of time requires quick decision-making and can provide a great sense of tension and speed to the player.

Also, changing the display of the choices as time passes can make it possible to adjust the difficulty of the game.

Third Embodiment

The third embodiment of the present invention relates to a game apparatus in which the player searches for items within the stage window W2 within a time limit.

Constitution

The game apparatus in the third embodiment is the same as the game apparatus used in the first embodiment. The CPU block 10 operates according to the flowchart in FIG. 13 by executing program data read from the CD-ROM 1.

Figure 14:
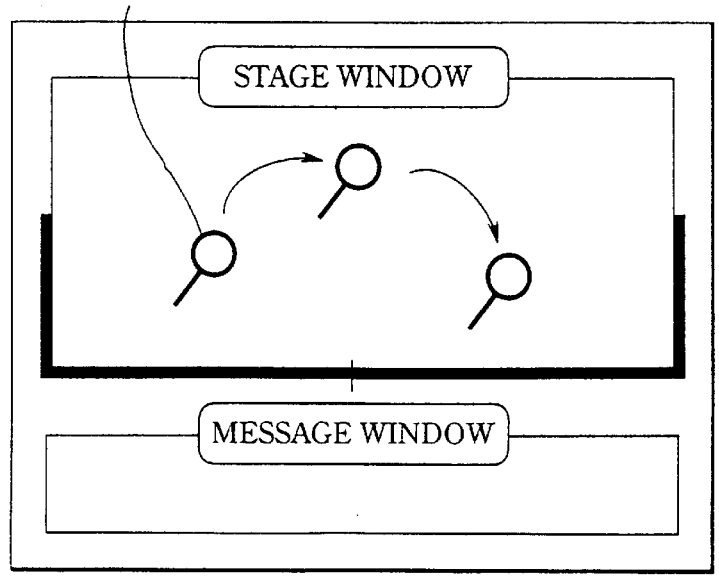
FIG. 14 shows an example of the cursor display for the stage window of the third embodiment.

In the present embodiment, the stage window W2 and message window W3 are displayed as shown in FIG. 14. A cursor T with a special magnifying glass shape is displayed as the cursor. Within the stage window W2 are displayed images of areas for the player to search, for example, an image of a room containing furniture and fixtures, or an image of an exterior where there are a plurality of stationary objects and animals.

Operation

Figure 13:
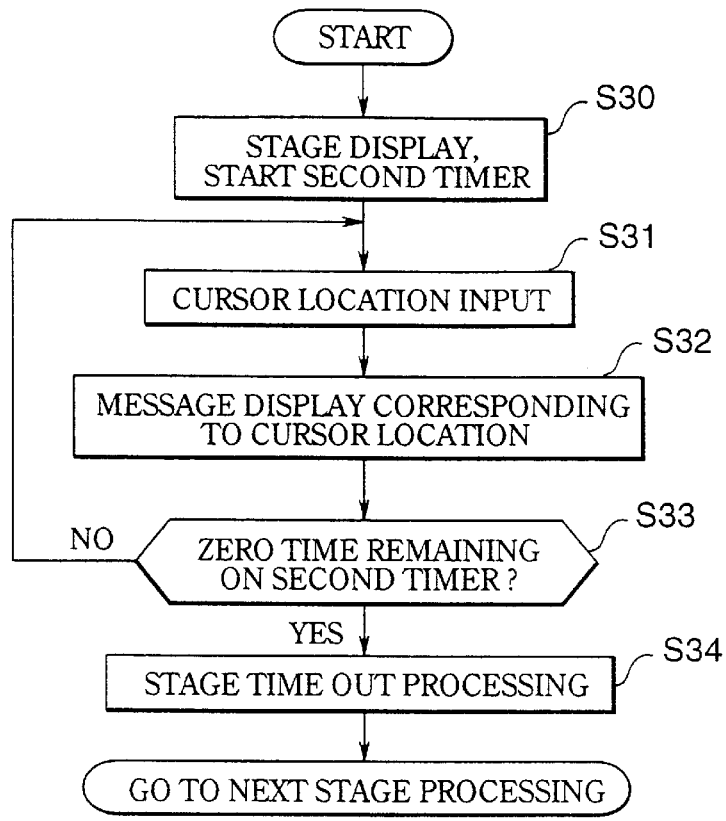
FIG. 13 is a flow chart to explain the processing in a third embodiment of the present invention.

Next, the operation of the third embodiment is explained with reference to FIG. 13. In the present embodiment, a stage is designated as a stage to be searched. The following processes explain the operation from when the stage to be searched is first displayed until the end.

Step S30: When a new stage begins, an image of a room or an exterior to be searched is displayed in the stage window W2. At the same time, the second timer TM2, as in the first embodiment, is started.

Step S31: The display bar of the second timer TM2 begins to extend from the starting point SP2 (see FIG. 3). The player operates the cursor T using the mouse or pad and searches the image. The player clicks the mouse or presses buttons on the pad at suspicious-looking fixtures. The game apparatus calculates the cursor location displayed on the screen on the basis of location data input from the mouse or pad and displays the cursor at that location. The player clicks the mouse button or presses pad buttons and specifies the location indicated by the cursor at the time when the buttons were pressed.

Step S32: The game apparatus is provided messages corresponding to each image as part of the program data. When cursor location is specified, the game apparatus specifies images of items such as a desk, clock, chair, bed, and shelves, if the image on the indicated screen is a stage wherein a room is being searched, for example, and reads messages corresponding thereto and displays the messages in the message window W3.

Messages such as "Not there!" are displayed if items are not hidden in the indicated fixtures. Messages such as "Yes! You found it!" are displayed if the item is hidden therein.

When a fixture is indicated, the situation thereof may also be displayed near the cursor. In effect, an atmosphere of searching can be imparted with the actions of opening a cupboard or pulling back a curtain.

Step S33: It is determined whether the second timer has zero time remaining, specifically if the display bar has reached the ending point EP2. If it has not reached the ending point EP2 (S33. NO), the process returns to Step S31 to continue the search.

Step S34: If the second timer has zero time remaining during the search, specifically if the display bar has reached the ending point EP2 (S33. YES), time out processing for the stage is carried out. In other words, an image of smoke emitting from the ending point EP1, as in the first embodiment, is displayed and the search results are reflected in the player's score. Also, the subsequent game scenario may be altered depending on whether anything was found or if the searched-for item was found.

EXAMPLE

The following scenario is explained as an example of the present embodiment.

Scenario of game stage: A girl is having a fitting for her kimono at a kimono shop. She suddenly realized that she left something at home, but her ride will come in three minutes.

She's still in the midst of her fitting, even though she wants to return home. The player, as the protagonist who has come to the shop to meet her, kindly offers to go to her place and look for her things. Once at her house, the protagonist does not know where her things are. The protagonist then combs through the fixtures in the house. The time limit is the three minutes until the transportation arrives.

The game stage develops in the scenario discussed above. The second timer TM2 is set with the three minutes until the transportation arrives as the time limit. The image displayed in the stage window W2 is the interior of the girl's house. Moreover, a sample variation of the image displayed in the stage window W2 could be searching for items in the dark, with the entire image dimmed so that the player has to feel around for the the individual fixtures for them to be displayed. As noted above, the third embodiment can increase a player's sense of tension by putting a time limit on searches.

Other Variations

The present invention is not limited to the aforementioned embodiments and a number of variations can be applied to the present invention.

For example, the aforementioned embodiments may be combined with each other.

(1) Combination of First Embodiment and Second Embodiment

In the first embodiment, one or more choice windows W1 (controlled with first timer) are displayed in one game stage (controlled with second timer). These choice windows W1 may be applied to the second embodiment. In this case, a time limit is applied to the entire stage. A time limit is also applied to the choice window W1, and the display of that choice window W1 changes gradually as time passes.

Consequently, this combination imposes three time limits on the player and can give the player a constant sense of tension.

(2) Combination of Second Embodiment and Third Embodiment

The third embodiment is a game of searching within a time limit (controlled with second timer); it is preferable that time-limited elements in the second embodiment be added to the stage window W2 and the mode of display of the images in the stage window W2 change more and more as time passes. In such a scenario, for example, a cat is in the house being searched. This cat moves here and there as time passes, and breaks a vase among the fixtures or disappears from the window while carrying a plate in its mouth. As time passes, the possibility of finding the sought object becomes less and less. Also, the sense of tension is exacerbated if the lights in the room are flickering and the room is only displayed intermittently. This is further developed if the search begins in the evening: the surroundings grow dimmer during the search and the fixtures become harder to discern.

Consequently, this combination can give the player a great sense of tension with the two time limits applied to the search.

(3) Combination of First Embodiment and Third Embodiment

It is preferable that the choice window W1 of the first embodiment be displayed in the midst of the search in the third embodiment. For example, in the search in the third embodiment, the choice window W1 is displayed from when the girl realizes that she's left something behind. If the correct choice is selected, the protagonist will go to her home to search for the item, but if the wrong choice is made, the protagonist will go and search a completely unrelated location. Consequently, this combination can provide a sense of insecurity to the player and heighten the interest of the game because the search location is not necessarily correct.

(4) Combination of First Embodiment, Second Embodiment, and third Embodiment

These three embodiments may be combined together. For example, the search game stage in the third embodiment may include the following: a problem arises on the way from the girl to the search area and a choice window W1, including an incorrect response thereto, is displayed. The problem is difficult, and if the player makes a choice slowly instead of quickly, as he/she would like, the choices change and the correct response may be eliminated. In this case, it is too late even if the correct response is understood after it disappears. The protagonist has to choose the second best option. When the response is slow, the choice window W1 itself may time out and then even the next best option cannot be chosen.

Consequently, this combination can provide interesting and very complex game play by combining a plurality of time limits in a complex manner.

Industrial Applicability

The present invention can add new interest to adventure games and can contribute to new developments of this type of game. Specifically, the present invention can provide a game which can give a player a greater sense of tension, because it is constituted with double time limits.

The present invention can provide a game which can give a player a greater sense of tension, because it is constituted to gradually change over time the contents of the actions a player can take, along with setting time limits for player actions. Also, the present invention can make it possible to adjust the difficulty of a game and give the player a sense of tension by changing the choices over time.

The present invention can provide a game which can give a player a greater sense of tension, because it is constituted to set time limits on player actions and to have the player search under a time limit.

What is claimed is:

1. A game apparatus requiring certain operations of a player within a time limit comprising:

means for displaying one window for a period of time within a first time limit;

means for displaying a second window separately from said first window for a period of time within a second time limit and means for displaying at least once said first window during the display of the second window.

2. The game apparatus according to claim 1 wherein a display contents and said first time limit according to the contents are set in advance for each of said first windows displayed at least once, the display is terminated for a first window with one content, when the player performs a certain operation within the first time limit set for the first window or when the first time limit expires, and another first window is displayed once more if said second time limit has not expired when the display of the first window is terminated.

3. The game apparatus according to claim 1 wherein a scenario of a game thereafter changes depending on the operation of the player for said first window or whether that operation was made within said first time limit.

4. The game apparatus according to claim 1 wherein a plurality of display contents and said second time limit depending on the display contents are set in advance for said second window and for a second window with one content, another second window to be displayed next is selected depending on a player's operation for said first window and on the number of first windows operated within the second time limit.

5. The game apparatus according to claim 1 wherein the first time limit of said first window and the second time limit of said second window are displayed using an image to show the passage of time, the length of said image changes as time passes.

6. A game apparatus requiring certain operations of a player within a time limit comprising:

means for displaying a window which includes at least one of a plurality of choices, wherein the operations by the player are possible;

means for changing gradually the display mode of the window as time passes and means for changing gradually the contents of at least one of the plurality of choices as time passes.

7. The game apparatus according to claim 6, wherein said window displays a plurality of choices that can be selected by the user and the choices displayed in the window are gradually changed as time passes.

8. A game apparatus requiring certain operations of a player within a time limit comprising:

means for displaying a plurality of images in a window;

means for changing the game scenario depending on whether the player selects any of the plurality images that make the player search within said time limit.

9. The game apparatus according to claim 8 wherein a display mode of said window changes as time passes.

10. The game apparatus according to claim 8 wherein the images displayed in said window change gradually as time passes.

11. The game apparatus according to claim 6 or 8 wherein the time limit of said window is shown using an image to show the passage of time, wherein the length of the image changes as time passes, and wherein the image is located along an edge of the window.

12. A game processing method requiring certain operations of a player within a time limit comprising the steps of:

displaying a first window for a period of time within a first time limit;

displaying a second window separately from said first window for a period of time within a second time limit and displaying at least once said first window during the display of the second window.

13. A game processing method requiring certain operations of a player within a time limit comprising the steps of:

displaying a window which includes at least one of a plurality of choices, which can be operated by a player;

changing gradually the display mode of the window as time passes and changing gradually the contents of at least one of the plurality of choices as time passes.

14. A game processing method requiring certain operations of a player within a time limit comprising the steps of:

displaying a plurality of images in a window;

changing a game scenario depending on whether a player selects any of the plurality images that make the player search within said time limit.

15. A recording medium, whereon is recorded a game processing program requiring certain operations of a player within a time limit said medium being mechanically readable by computer comprising:

means for displaying a first window for a period of time within a first time limit;

means for causing a second window separately from said first window for a period of time within a second time limit and means for causing said first window to be displayed at least once during the display of the second window.

16. A recording medium, whereon is recorded a game processing program requiring certain operations of a player within a time limit said medium being mechanically readable by computer comprising:

means for displaying a window which includes at least one of a plurality of choices, which is operated by a player;

means for causing the display mode of the window to change gradually as time passes and means for changing gradually the contents of at least one of the plurality of choices as time passes.

17. A recording medium, whereon is recorded a game processing program requiring certain operations of a player within a time limit said medium being mechanically readable by computer comprising:

means for displaying a plurality of images in a window;

means for causing a game scenario depending on whether a player selects any of the plurality images that make the player search within said time limit.

* * * * *